United States Patent
Bonandrini et al.

(10) Patent No.: US 10,934,975 B2
(45) Date of Patent: Mar. 2, 2021

(54) SYSTEM TO FEED WATER TO AT LEAST ONE COMBUSTION CHAMBER IN AN INTERNAL COMBUSTION ENGINE

(71) Applicant: MARELLI EUROPE S.p.A., Corbetta (IT)

(72) Inventors: Giovanni Bonandrini, Bologna (IT); Giovanni Stanzani, Bologna (IT); Federico Monti, Bologna (IT); Antonio Barbuto, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/507,478

(22) Filed: Jul. 10, 2019

(65) Prior Publication Data
US 2020/0018263 A1 Jan. 16, 2020

(30) Foreign Application Priority Data
Jul. 12, 2018 (IT) .................. 102018000007136

(51) Int. Cl.
*F02M 25/00* (2006.01)
*F02M 25/025* (2006.01)
(Continued)

(52) U.S. Cl.
CPC .............. *F02M 25/025* (2013.01); *F01P 3/20* (2013.01); *F02B 47/02* (2013.01);
(Continued)

(58) Field of Classification Search
CPC .. F02M 25/025; F02M 25/0222; F02M 25/08; F02M 205/0224; F02P 23/00;
(Continued)

(56) References Cited

U.S. PATENT DOCUMENTS

| 1,409,593 | A | * | 3/1922 | Schram | B01D 47/18 96/228 |
| 8,881,530 | B2 | * | 11/2014 | Gulen | F01K 3/16 60/736 |

(Continued)

FOREIGN PATENT DOCUMENTS

| DE | 102008034903 A1 | 1/2010 |
| DE | 102016011488 A1 | 3/2017 |

(Continued)

OTHER PUBLICATIONS

Microbiological removal of engine oils from natural water using plant-derived sorbents, N. Morozov, Research Journal of Pharmaceutical, Biological and Chemical Sciences, 2016, vol. 7, N5, pp. 1728-1735 (Year: 2016).*

(Continued)

*Primary Examiner* — Syed O Hasan
(74) *Attorney, Agent, or Firm* — Howard & Howard Attorneys PLLC

(57) ABSTRACT

A system for feeding water to at least one combustion chamber in an internal combustion engine having: a tank designed to contain a quantity of water; a feeding duct; a pump designed to draw water from the tank and to pump pressurised water into the feeding duct; and at least one silver-containing body which is contained in the tank in contact with the water.

14 Claims, 2 Drawing Sheets

(51) Int. Cl.
| | |
|---|---|
| *F02M 25/022* | (2006.01) |
| *F02P 23/00* | (2006.01) |
| *F02M 25/08* | (2006.01) |
| *F02B 47/02* | (2006.01) |
| *F01P 3/20* | (2006.01) |
| *C02F 1/50* | (2006.01) |
| *C02F 1/32* | (2006.01) |

(52) U.S. Cl.
CPC ........ *F02M 25/0222* (2013.01); *F02M 25/08* (2013.01); *F02P 23/00* (2013.01); *C02F 1/32* (2013.01); *C02F 1/325* (2013.01); *C02F 1/50* (2013.01); *C02F 1/505* (2013.01); *F01P 2060/18* (2013.01); *F02M 25/0224* (2013.01)

(58) Field of Classification Search
CPC .... C02F 1/505; C02F 1/32; C02F 1/50; C02F 1/325; F01P 3/20; F01P 2060/18; F02B 47/02
See application file for complete search history.

(56) References Cited

U.S. PATENT DOCUMENTS

| | | |
|---|---|---|
| 2011/0174717 A1 | 7/2011 | Braunheim et al. |
| 2018/0128212 A1* | 5/2018 | Burak ................ F02M 25/0224 |
| 2019/0257270 A1* | 8/2019 | Burak ................ F02M 25/0222 |

FOREIGN PATENT DOCUMENTS

| | | | | |
|---|---|---|---|---|
| DE | 102017215761 | * | 9/2017 | .......... F02M 25/025 |
| DE | 102016217736 A1 | | 3/2018 | |
| EP | 3106751 A1 | | 12/2016 | |
| WO | 2018050394 A1 | | 3/2018 | |
| WO | 2018050893 A1 | | 3/2018 | |
| WO | 2018050895 A1 | | 3/2018 | |

OTHER PUBLICATIONS

Search Report for Italian Patent Application No. 201800007136 dated Feb. 5, 2019.

* cited by examiner

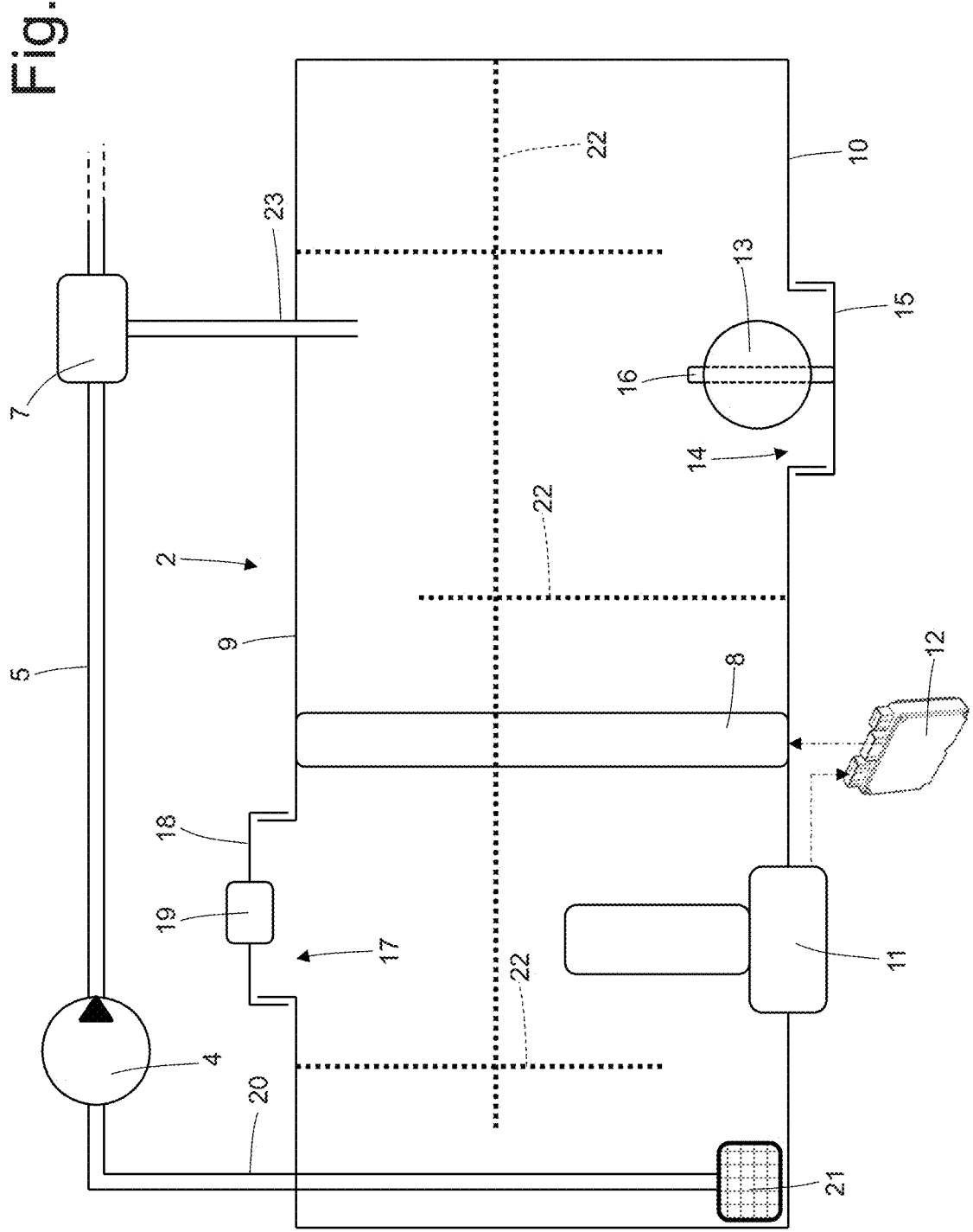

SYSTEM TO FEED WATER TO AT LEAST ONE COMBUSTION CHAMBER IN AN INTERNAL COMBUSTION ENGINE

CROSS-REFERENCE TO RELATED APPLICATIONS

This patent application claims priority from Italian patent application no. 102018000007136 filed on Jul. 12, 2018, the entire disclosure of which is incorporated herein by reference.

TECHNICAL FIELD

The present invention relates to a system to feed water to at least one combustion chamber in an internal combustion engine.

PRIOR ART

As known, in an internal heat combustion engine it has been proposed to feed water in addition to fuel into the combustion chambers defined inside the cylinders.

In an internal combustion engine, the water injection system comprises the introduction of water into the engine through the intake duct, in the form of spray, or mixed with fuel, or directly into the combustion chamber, in order to cool the air/fuel mixture by increasing resistance to detonation phenomena. Water has a high latent vaporization heat, in other words it requires a lot of energy to switch from the liquid to the gaseous state. When water at room temperature is injected into the intake duct, it absorbs heat from the inlet air and metal walls, evaporating, and thus cooling the input load. The engine therefore draws in cooler air, in other words denser air, improves the volumetric efficiency and reduces the possibility of detonation, and it is also possible to inject more fuel. During compression, the water present in tiny droplets evaporates and absorbs heat from the air being compressed, cooling it and lowering its pressure. After compression, combustion takes place, and here there is a further beneficial effect: during combustion much heat develops, which is absorbed by the water, reducing the peak temperature of the cycle and consequently reducing the formation of NOx and the heat that the engine walls must absorb. This evaporation also converts part of the heat of the engine (which would otherwise have been wasted) into pressure, given precisely by the steam formed, increasing the thrust on the piston and also increasing the flow of energy into a possible exhaust turbine (the turbine, in addition, benefiting from the reduction in the temperature of the exhaust gases thanks to the absorption of heat by the additional water).

The water feeding system comprises a tank that is filled with demineralised water (to avoid the formation of incrustations); the tank can be supplied from outside the vehicle or it could also be supplied by using the condensate of the air conditioner, the condensate of the exhaust, or even by channeling rainwater.

The patent application WO2018050895A1 discloses an injection system of demineralised water into the combustion chambers of an internal combustion engine. The injection system comprises a demineralised water storage tank equipped with an electric heater that is activated to melt any ice that has formed inside the tank. According to a preferred embodiment, at least one tank wall comprises an antimicrobial agent.

The patent application WO2018050394A1 describes a water injection system for an internal combustion engine of a motor vehicle; the injection system comprises at least one water injector, a water tank and a feeding line connecting the water tank to the water injector. According to a preferred embodiment, a wall of the water tank is coated with a biocide for controlling harmful organisms (e.g. algae, fungi, bacteria or other microorganisms), in other words to prevent and combat biocontamination by harmful organisms. A biocide is defined as a substance or mixture of substances which is capable of combating harmful organisms in a manner other than mere physical or mechanical action, i.e. it is capable of destroying harmful organisms in order to discourage, neutralise, prevent their effects or otherwise combat them.

DESCRIPTION OF THE INVENTION

The object of the present invention is to create a system to feed water to at least one combustion chamber in an internal combustion engine, said feeding system ensuring an effective and efficient water supply also in the long term, i.e. years after the commissioning of the internal combustion engine.

According to the present invention a system to feed water to at least one combustion chamber in an internal combustion engine is provided as set forth in the appended claims.

BRIEF DESCRIPTION OF THE DRAWINGS

The present invention will now be described with reference to the appended drawings, which illustrate a non-limiting embodiment, wherein:

FIG. 2 schematically shows a water feeding tank of FIG. 1.

PREFERRED EMBODIMENTS OF THE INVENTION

Figure 1:
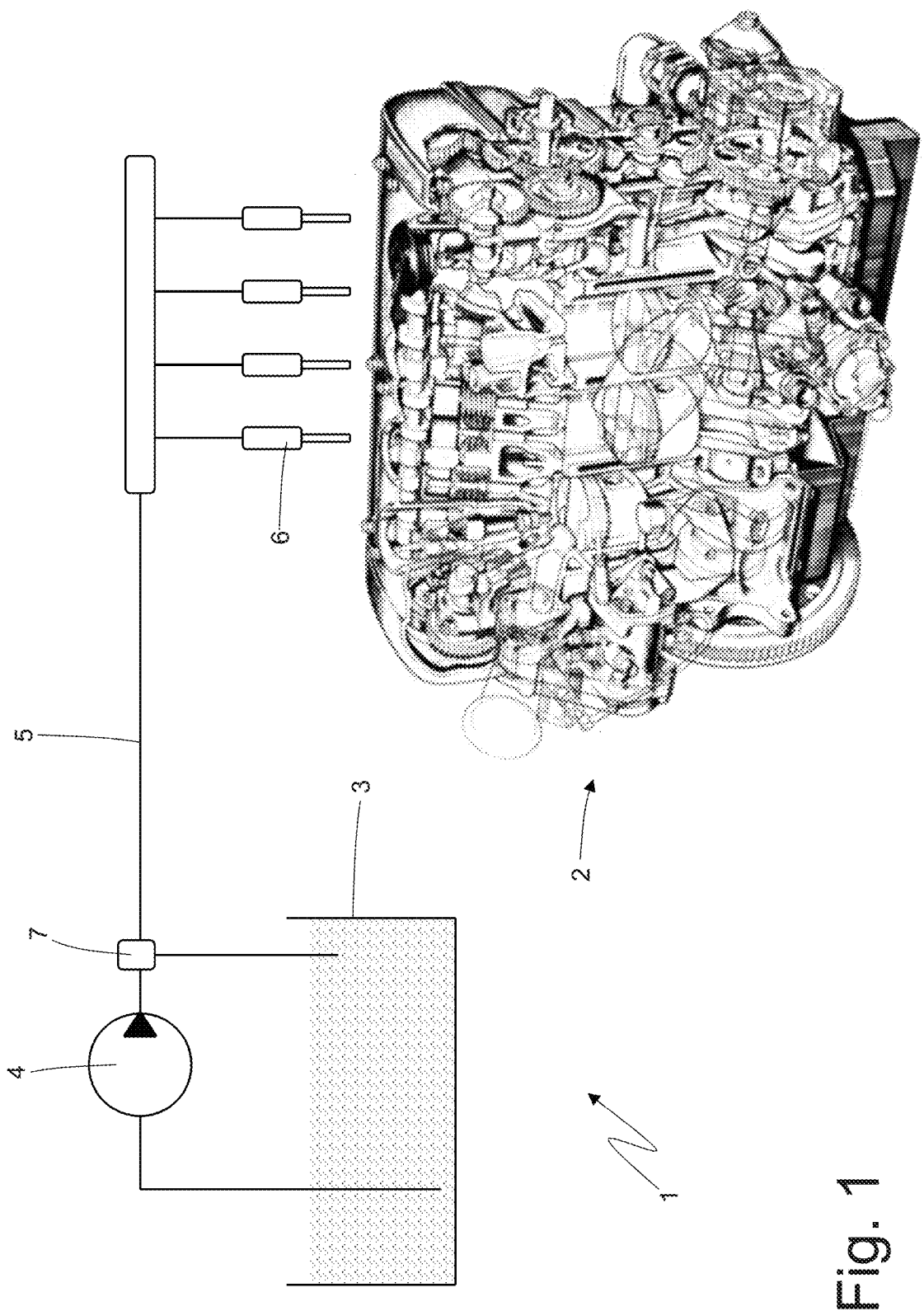
FIG. 1 is a schematised view of a system to feed water to at least one combustion chamber in an internal combustion engine.

In FIG. 1, reference numeral 1 globally denotes a system to feed water to an internal heat combustion engine 2; the water is intended for the combustion chambers made in the cylinders of the internal heat combustion engine 2 to increase the efficiency of combustion and/or to increase the power generated.

The feeding system 1 comprises a tank 3 containing a mass of demineralised water and a pump 4 designed to draw water from inside the tank 3 and send the pressurized water to a feeding duct 5. A plurality of injectors 6 are connected to an end portion of the feeding duct 5 and the low pressure water is injected into corresponding intake ducts through which fresh air is conveyed to the cylinders. According to another embodiment, the injectors 6 could inject the high pressure water directly into the cylinders (in this case an additional high pressure pump is generally provided). According to a further embodiment, the water supplied by the feeding system 1 is mixed with the fuel that is injected into the cylinders.

A maximum pressure valve 7 is arranged along the feeding duct 5 immediately downstream of the pump 4, i.e. a valve that opens, re-introducing the excess water into the tank 3 when the pressure inside the feeding duct 5 exceeds a predetermined threshold value; substantially, the maximum pressure valve 7 acts as a pressure regulator to prevent the pressure inside the feeding duct 5 from exceeding the predetermined threshold value.

According to an alternative and perfectly equivalent embodiment, a pressure sensor is provided arranged downstream of the pump 4 (e.g. in a common channel to which the injectors 6 are connected) and the flow rate of the pump 6 is adjusted in feedback to maintain the pressure downstream of the pump 4 around a desired value (which may also be variable depending on the engine point).

As illustrated in FIG. 2, the feeding system 1 comprises a heating device 8 that is coupled to the tank 3 and is designed to heat the water contained in said tank 3. According to a preferred embodiment, the heating device 8 is arranged inside the tank 3 to be in direct contact with the water contained in the tank 3, i.e. the heating device 8 is arranged between a top wall 9 and a bottom wall 10 of the tank 3. According to a preferred embodiment, the heating device 8 comprises an electrical thermo-resistance (i.e. an element that transforms electrical energy into heat by Joule effect) and also a liquid-liquid heat exchanger that transfers to the water contained in the tank 3 part of the heat possessed by a coolant liquid of the internal combustion engine 2; obviously, the heating device 8 could comprise only the electrical thermo-resistance or only the liquid-liquid heat exchanger.

As illustrated in FIG. 2, the feeding system 1 comprises a sensor 11 that is preferably arranged through the bottom wall 10 of the tank 3 and is adapted to measure the temperature, level and quality of the water contained in the tank 3. In other words, the sensor 11 integrates, in a single body, three different sensitive elements that are designed to determine the temperature, level and quality of the water contained in the tank 3, respectively. By way of example, the sensor 11 could determine the level of water contained in the tank 3 (i.e. the filling degree of the tank 3) by means of ultrasound.

By way of example, the sensor 11 could determine the density and electrical conductivity of the water contained in the tank 3, since the density and electrical conductivity are indicators of the quality of the water contained in the tank 3. If the density of the water contained in tank 3 is significantly lower than a first predetermined threshold value (around 997 kg/m$^3$ corresponding to the density of pure water), then it is an indication that polluting liquids less dense than water (typically engine oil, petrol or diesel) are present in the water. On the other hand, if the electrical conductivity contained in the tank 3 is significantly higher than a second threshold value, then it is an indication that mineral salt ions are present in the water (i.e. the water is not adequately demineralised and therefore in the long run may give rise to incrustations).

The feeding system 1 comprises a control unit 12 that oversees the operation of said feeding system 1 and, among other things, receives the readings performed by the sensor 11 and pilots the heating device 8.

When the sensor 11 detects an unsatisfactory quality of the water contained in the tank 3, the control unit 12 generates a signal for the driver of the vehicle in which the internal heat combustion engine 2 is installed and, if the quality of the water contained in the tank 3 is very unsatisfactory, interrupts the water supply to the internal heat combustion engine 2 (thus operating the internal heat combustion engine 2 in a low-performance mode not being able to enjoy the benefits given by the injection of water) and requiring emptying and washing of the tank 3.

Generally, the control unit 12 uses the heating device 8 when the temperature of the water contained in the tank 3 (and detected by the sensor 11) is below or close to zero to prevent the formation of ice inside the tank 3 or to melt the previously formed ice (in the case of a cold start of the internal heat combustion engine 2 after a relatively long stop). In this case, the control unit 12 pilots the heating device 8 to heat the water contained in the tank 3 to a temperature slightly above zero (e.g. 5° C.-10° C.), as the sole purpose of the heating is to prevent the formation of ice or melt any ice present.

The water contained in the tank 3 may contain microorganisms (e.g. bacteria, spores . . . ), or living organisms of such dimensions that they cannot be seen with the naked eye (less than 0.1 mm). Such microorganisms can proliferate over time inside the tank 3 generating colonies that can, for example, obstruct (partially or completely) the water intake of the pump 4 or can be drawn in by the pump 4 and then sent to the injectors 6 with the risk of clogging the pump 4, any filters placed downstream of the pump 4, the injectors 6 or, if they reach the combustion chambers made in the cylinders of the internal heat combustion engine 2, of disturbing combustion with a potential decrease in performance and/or a potential increase in the generation of pollutants. In other words, the microorganisms that are present in the water contained in the tank 3 may proliferate and increase in number over time, leading, for example, to the formation of algae or biofilm on the walls of the tank 3; such algae or biofilm detaching from the walls may obstruct the intake of the pump 4 or may even be drawn in by the pump 4 and thus reach the injectors 6 and/or the combustion chambers made in the cylinders.

The control unit 12 (occasionally) pilots the heating device 8 to also heat the water contained in the tank 3 to a temperature greater than 60° C. (preferably 70° C.) for a time greater than 20 seconds (preferably greater than 40-60 seconds) in order to obtain a heat treatment (i.e. a kind of sterilization/pasteurization) of the water contained in the tank 3 (i.e. in order to obtain, by effect of the heat, a reduction in the concentration of microorganisms present in the water 3 contained in the tank 3). It is important to emphasize that the heat treatment that is carried out using the heating device 8 is a kind of sterilization (that is, partial, incomplete sterilization) because, not being able to reach very high temperatures (above 100° C.) in order not to damage the tank 3 or the components housed in said tank 3, at the end of the heat treatment the water contained in the tank 3 is not "sterile" in the medical sense, but in any case it has significantly reduced the presence of microorganisms.

In other words, the control unit 12 uses (occasionally) the heating device 8 (initially provided only for the anti-ice function) to subject the water contained in the tank 3 to a heat treatment aimed at reducing (as far as possible) microorganisms in vegetative form, germs and, with a prolonged action, also some bacterial spores. Experimental tests have shown that heating the water contained in the tank 3 to 70° C.-75° C. for at least 2-5 minutes can achieve a 90-98% reduction in total bacterial concentration.

Generally, the control unit 12 determines when new water has been added inside the tank 3 and then pilots the heating device 8 to heat (in order to carry out a heat treatment aimed at reducing the concentration of microorganisms) the water contained in the tank 3 immediately after the addition of new water inside the tank 3.

Namely, as soon as new potentially non-sterile water is added, the control unit 12 performs (at least) a heat treatment aimed at reducing the concentration of microorganisms of all the water contained in the tank 3. The addition of new water to the tank 3 is determined based on the level signal provided by the sensor 11, i.e. the control unit 12 determines that new water has been added inside the tank 3 when an increase in the level of the water contained in the tank 3 occurs.

According to a possible embodiment, the control unit 12 performs (at least) one heat treatment aimed at reducing the concentration of microorganisms of all the water contained in the tank 3 at a time interval (e.g. monthly, bimonthly, quarterly . . . or every month since the last heat treatment) regardless of the addition of new water to the tank 3.

Generally, the heating device 8 can be used to perform a heat treatment aimed at reducing the concentration of microorganisms only when the internal combustion engine 2 is switched on, i.e. when the coolant of the internal combustion engine 2 is suitably hot and/or when the internal combustion engine 2 can generate (through its alternator) a sufficient amount of electrical energy for the thermo-resistance of the heating device 8. As a result, when it is necessary to heat the water contained in the tank 3 to carry out the heat treatment aimed at reducing the concentration of microorganisms, the control unit 12 must, in any case, wait for the first useful opportunity, namely the first ignition (sufficiently long) of the internal combustion engine 2.

According to the embodiment illustrated in FIG. 2, at least one silver-containing body 13 is provided which is contained in the tank 3 in contact with the water; the silver is an antibacterial agent, i.e. it has an antibacterial capacity (exerted both in the presence of release of Ag+ silver ions, and in the absence of release of Ag+ silver ions). In other words, silver has natural bacteriostatic properties that allow the bacterial concentration of the water contained in the tank 3 to be kept under control, thus preventing the proliferation of algae and biofilms over time.

In the embodiment illustrated in the accompanying Figures, a single silver containing body 13 is provided, of a spherical shape (but it could also be another shape, for example parallelepiped or pyramidal) which is placed inside the tank 3. According to a preferred embodiment, the bottom wall 10 of the tank has an opening 14, which is closed (watertight) by a plug 15 (preferably) screwed; the silver-containing body 13 is detachably mounted to the plug 15, i.e. is integral with said plug 15. According to a preferred embodiment, the plug 15 has a pin 16 projecting cantilevered from said plug 15 towards the inside of the tank 3 and the silver-containing body 13 centrally has a hole that is fitted around the pin 16 (with some effort to obtain an interference lock) to secure the silver-containing body 13 to the plug 15; for example, the pin 16 could have a truncated conical shape that increases in size approaching the plug 15 to facilitate an interference lock of the silver-containing body 13 to the pin 16. The opening 14 could be used to completely empty the tank 3 during a washing operation of the said tank 3.

It is important to emphasise that the opening 14 may also have a significant dimension that is far greater than the actual emptying needs of the tank 3 and is aimed at having a large sized plug 15 that allows other components to be housed in addition to the pin 16 on which the silver-containing body 13 is mounted; in this way, by disassembling (unscrewing) the plug 15 all the components mounted on the plug 15 can be brought to the outside of the tank, which thus becomes easy to inspect and service. For example, the heating device 8, the pump 4, and/or the filter 21 could be mounted on the plug 15 (in addition to the silver-containing body 13).

According to an alternative embodiment (which could also be combined with the presence of the single silver-containing body 13), the walls of the tank 3 are at least partially coated internally with a silver coating layer which is therefore in direct contact with the water contained in the tank 3.

According to an alternative embodiment (which could also be combined with the presence of the single silver containing body 13), the walls of the tank 3 are made of plastic material charged with silver fibres that are therefore in direct contact with the water contained in the tank 3.

The upper wall 9 of the tank has a filling opening 17 (i.e. an opening used to add water to the tank 3), which is sealed by a screwed plug 18; preferably, the plug 18 is provided with a two-way vent valve 19 (i.e. operating both when the tank 3 is over-pressured with respect to the external environment, and when the tank 3 is under-pressured with respect to the external environment), or with an automatic air passage valve that serves to maintain the pressure inside the tank 3 equal to the pressure of the external environment to ensure the smooth operation of the pump 4.

According to a preferred embodiment illustrated in the attached Figures, the pump 4 draws water from the tank 3 by means of a intake duct 20 that originates inside the tank 3 near the bottom wall 10 of said tank 3. In particular, the intake duct 20 of the pump 4 originates with a filter 21 (i.e. at the inlet of the intake duct 20 a filter 21 is arranged); by way of example, the filter 21 is mechanical and is designed to block all particles having a size greater than 10 μm.

According to a preferred embodiment illustrated in the attached Figures, a series of walls 22 (possibly perforated) are provided that are arranged inside the tank to define a maze having an anti-sloshing function; generally the walls 22 have at least two different orientations perpendicular to each other.

Lastly, as illustrated in FIG. 2, a recirculation duct 23 originates from the maximum pressure valve 7 that re-introduces the excess water into the tank 3 (i.e. the water that the maximum pressure valve 7 removes from the feeding duct 5 to reduce the pressure inside said feeding duct 5). According to a possible embodiment, the maximum pressure valve 7 can be realized simply by arranging along the recirculation duct 23 a one-way valve that opens when the pressure differential at its ends (i.e. the pressure differential between the feeding duct 5 and the tank 3) is greater than the predetermined threshold value; in series with the one-way valve the recirculation duct 23 could comprise a calibrated bottleneck that limits the flow of water flowing through the recirculation duct 23.

According to a preferred embodiment, the tank 3 is made of a material (generally plastic) opaque to light to keep the inside of the tank 3 in the dark at all times, since light promotes the proliferation of microorganisms.

According to a preferred embodiment, the inner surface of the tank 3 is smooth to make the adhesion of microorganisms to said inner surface more complicated; in particular, the surface roughness of the inner surface of the tank 3 is preferably less than 5 μm.

In the embodiment illustrated in the attached Figures, the pump 4 is arranged externally to the tank 3; according to a different, and perfectly equivalent, embodiment the pump 4 is arranged internally to the tank 3, i.e. it is integrated into the tank 3.

In the embodiment illustrated in the accompanying Figures, both water heating and the presence of the silver-containing body 13 are used to limit the proliferation of microorganisms in the water contained in the tank 3; according to other embodiments not illustrated, only water heating or only the presence of the silver-containing body could be used to limit the proliferation of microorganisms in the water contained in the tank 3.

The embodiments described herein may be combined with each other without departing from the scope of protection of the present invention.

The feeding system 1 described above has numerous advantages.

Firstly, the feeding system 1 described above allows the proliferation of microorganisms inside the tank 3 to be effectively and efficiently prevented, even in the long term (i.e. years after the commissioning of the internal heat combustion engine 2); in this way, the feeding system described above is always maintained in perfect efficiency avoiding the risk that the proliferation of microorganisms inside the tank 3 may obstruct (completely or partially) the intake duct 20 of the pump 4 and in particular the filter 21 coupled to the inlet of the intake duct 20, and also preventing microorganisms which have grown inside the tank 3 from reaching the injectors 6 and the combustion chambers made in the cylinders of the internal heat combustion engine 2.

Furthermore, the feeding system 1 described above does not provide for the addition of any type of additive to the water contained in the tank 3, thus guaranteeing the purity of said water. In fact, anything that is added to the water necessarily enters the combustion chambers and is subsequently released into the external environment through the exhaust duct of the internal heat combustion engine 2; it is therefore generally inadvisable to add to the water contained in the tank 3 sterilizing additives that dissolve in the water.

Lastly, the feeding system 1 described above is simple and economical to make since to limit the proliferation of microorganisms in the water contained in the tank 3 it uses components (the heating device 8) already present for other purposes or it uses components (the silver-containing body 13) which do not have an excessive cost and are easily available on the market.

LIST OF REFERENCE NUMBERS OF THE FIGURES 1 feeding system
2 internal combustion engine
3 tank
4 pump
5 feeding duct
6 injectors
7 maximum pressure valve
8 heating device
9 top wall
10 bottom wall
11 sensor
12 control unit
13 silver-containing body
14 opening
15 plug
16 pin
17 filling opening
18 plug
19 vent valve
20 intake duct
21 filter
22 walls
23 engine recirculation duct

The invention claimed is:

1. A feeding system (1) to feed water to at least one combustion chamber in an internal combustion engine (2); the feeding system (1) comprises:
   a tank (3), which is designed to contain a quantity of water and has a bottom wall (10) provided with an opening (14);
   a plug (15) which seals the opening (14) tight and has a pin (16), which projects from said plug (15) towards the inside of the tank (3);
   a body (13) containing an antibacterial agent and placed inside the tank (3) in contact with the water, wherein the body (13) has a hole located at its center, which is fitted around the pin (16) so as to fix said body (13) to the plug (15);
   a feeding duct (5); and
   a pump (4), which is designed to draw water from the tank (3) and pump pressurized water into the feeding duct (5);
   wherein the body (13) containing the antibacterial agent is mounted in a detachable manner on the plug (15).

2. The feeding system (1) according to claim 1, wherein the pin (16) has a truncated conical shape that increases in size approaching the plug (15).

3. The feeding system (1) according to claim 1, wherein the antibacterial agent is silver.

4. The feeding system (1) according to claim 3, wherein the walls of the tank (3) are at least partially internally covered by a silver covering layer.

5. The feeding system (1) according to claim 3, wherein the walls of the tank (3) are made of a plastic material charged with silver fibres.

6. The feeding system (1) according to claim 1 and comprising:
   a heating device (8), which is arranged inside the tank (3) and is designed to heat the water contained in said tank (3) and
   a control unit (12), which is designed to control the heating device (8) so as to heat the water contained in the tank (3) to a temperature above 60° C. for an amount of time exceeding 20 seconds in order to carry out a heat treatment aimed at reducing the concentration of microorganisms present in the water contained in the tank (3).

7. A feeding system (1) according to claim 6, wherein the heating device (8) comprises an electric thermistor and/or a liquid-liquid heat exchanger, which transfers part of the heat of a cooling liquid of the internal combustion engine (2) to the water contained in the tank (3).

8. The feeding system (1) according to claim 6, wherein the control unit (12) is designed to determine when new water has been added inside the tank (3) and is designed to pilot the heating device (8) to heat the water contained in the tank (3) after the addition of new water inside the tank (3).

9. The feeding system (1) according to claim 8, wherein:
   the tank (3) is fitted with a sensor (11), which is designed to measure the level of the water contained in the tank (3); and
   the control unit (12) establishes that new water has been added inside the tank (3) when an increase in the level of the water contained in the tank (3) occurs.

10. The feeding system (1) according to claim 6, wherein the control unit (12) is designed to pilot the heating device (8) to heat the water contained in the tank (3) at a predetermined time interval regardless of the addition of new water into the tank (3).

11. The feeding system (1) according to claim 6, wherein:
the control unit (12) is designed to pilot the heating device (8) to heat the water contained in the tank (3) to perform heat treatment aimed at reducing the concentration of microorganisms only when the internal combustion engine (2) is switched on; and when it is necessary to heat the water contained in the tank (3) to carry out the heat treatment aimed at reducing the concentration of microorganisms, the control unit (12) waits for the first ignition of the internal combustion engine (2).

12. The feeding system (1) according to claim 1, wherein the tank (3) is made of a material opaque to light so as to always keep the inside of the tank (3) in the dark.

13. The feeding system (1) according to claim 1, wherein an inner surface of the tank (3) is smooth and has a surface roughness below 5 μm.

14. An internal combustion engine (2) comprising:
at least one cylinder, where a combustion chamber is defined; and a system (1) for feeding water to the combustion chamber according to claim 1.

* * * * *